United States Patent Office 2,701,640
Patented Feb. 8, 1955

2,701,640

PURIFICATION OF ACTIVATED GLASS SANDS

James B. Duke, Medulla, and Harvie W. Breathitt, Lakeland, Fla., assignors to Minerals & Chemicals Corporation of America, a corporation of Maryland No Drawing. Application May 24, 1952,
Serial No. 289,909

2 Claims. (Cl. 209—166)

This invention relates to the purification of glass sands, particularly activated glass sands, containing small amounts of impurities which must be almost entirely removed before the sands can be used for glass making.

One of the most objectional impurities in glass sands is iron oxide, $Fe_2O_3$, and this together with other impurities can often be substantially removed by flotation treatments as described, for instance, in the process of the patent to Tartaron and Duke 2,283,295 owned by the assignee of the present application, upon which process the process of the present invention may be considered to be in the nature of an improvement.

The process of said Tartaron and Duke patent is useful for the treatment of many glass sands; but it has been found not entirely satisfactory when applied to the purification of glass sands in which the silica is activated in some way, possibly by the presence of iron in the water which percolated through the sands as they were present in the earth, or because of the presence of iron in the water used in the preliminary washing of the sands, although in many cases no iron oxide is visible on the silica particles. Whatever the cause of the activation of the silica particles, the process of the Tartaron and Duke patent is not satisfactory in the treatment of such sands. It is well known, of course, that iron oxide can be substantially removed from glass sands by washing them with a mineral acid, preferably hot sulfuric acid. Such a leaching treatment with acid, however, is rather expensive and although effective in removing iron stains from the surface of the silica particles does not remove separate particles of iron oxide unless comparatively large amounts of acid are used. These particles of iron oxide are preferably and more cheaply removed by flotation as in the process of the Tartaron and Duke patent.

When this process is employed on glass sands in which the silica has been activated, however, it is found that practically all the silica is floated also. An object of the present invention is to overcome this difficulty and to permit the removal of the iron oxide by flotation while leaving a purified glass sand as a residue.

In the process of Tartaron and Duke, a fatty or resin acid, together with an alkali or, alternatively, an alkali salt of a fatty acid is used.

The process which is the present invention is the result of the surprising discovery that if a small amount of mineral acid (such as sulfuric, hydrochloric or nitric acid) is introduced into a thick pulp of activated glass sands, after the pulp has been conditioned for flotation treatment with anionic reagents in the manner described in said Tartaron and Duke patent, and if the pulp is then further conditioned then on diluting and subjecting the conditioned pulp to flotation treatment the iron and other contaminants float in a normal manner, thereby producing a froth product containing most of the iron and other impurities which are discarded, and leaving a residue containing a very large part of the silica which has been largely freed from contaminants.

The mineral acid so used in the process of the present invention is used in such a small amount that it does not dissolve the iron impurities existing on the surface of or mixed with the silica particles. This fact has been proved in the following way: Two separate samples of the same activated glass sands were agitated in water after adding to each sample the same amount of the anionic reagents referred to in the Tartaron and Duke Patent, without removing any froth product. Then, to one of the two conditioned pulps was added, after the first minute of agitation, a small amount of sulfuric acid, namely 0.4 lb. per ton of solids in the pulp, after which the agitation of that pulp was continued for another minute. The thus differently treated two samples of glass sands were separated from the water by decantation, dried and analyzed. The total $Fe_2O_3$ found in the sands treated with anionic reagents, without sulfuric acid, was 0.136%; and the total $Fe_2O_3$ in the sample treated with anionic reagents, and also with sulfuric acid, was 0.132%. These amounts of $Fe_2O_3$ in the two samples are so nearly alike that obviously no dissolution of the $Fe_2O_3$ took place in the sample of sands to the pulp of which the small amount of sulfuric acid was added. Therefore, it is apparent that the acid employed in the process of the present invention is insufficient appreciably to dissolve the iron impurities in the sands treated.

The following test, applied to an activated glass sand, shows the ineffectiveness of the process of the Tartaron and Duke patent on this particular sand. The sand was first washed and screened on a 20 mesh Tyler screen in the usual manner to remove earthy material and coarse sand. This provided 500 grams of minus 20 mesh sand which was made into a thick aqueous pulp containing about 70% solids, in a laboratory paddle-type conditioner. To this pulp was added 0.3 lb. of caustic soda, 1.0 lb of fuel oil, 1.0 lb. of tall oil, and 0.2 lb. of pine oil, all per ton of solids. The pulp was then agitated for about two minutes, and the thus conditioned pulp was then transferred to a laboratory Airflow flotation machine, diluted with water and subjected to froth-flotation treatment which resulted in a froth product and a machine discharge. The metallurgical results were as follows:

| Product | Percent Weight | Percent $Fe_2O_3$ |
|---|---|---|
| Feed | 100.0 | 0.1276 |
| Froth Product | 96.5 | 0.127 |
| Machine Discharge | 3.5 | 0.147 |

Obviously, no useful results was achieved in this test, because practically the whole charge floated, and the froth product contained about the same percentage of $Fe_2O_3$ as did the original glass sands. Evidently, the activated condition of these particular glass sands prevented successful treatment of them by the process of the Tartaron and Duke patent.

The following examples show the excellent results obtained by the process of the present invention applied to the same activated glass sands. The sands used in the examples were first washed and screened on a 20 mesh Tyler screen, the plus 20 mesh portion was discarded, and the minus 20 mesh portion was used in the examples.

Example I

A 500 gram charge of the same washed and screened activated glass sands was made into a thick aqueous pulp containing about 70% solids and was conditioned in a laboratory paddle-type conditioner with the same anionic reagents as those used in the test hereinbefore mentioned, namely, 0.3 lb. of caustic soda, 1.0 lb. of fuel oil, 1.0 lb. of tall oil, and 0.2 lb. of pine oil, all per ton of solids in the feed. After agitation of said thick pulp for about a minute, 0.4 lb. of sulfuric acid, per ton of feed, was added to the conditioned thick pulp; and the agitation was continued for about 1 minute more. The thus conditioned thick pulp was then transferred to a laboratory Airflow flotation machine, was diluted with water and subjected to froth-flotation treatment. The metallurgical results were as follows:

| Product | Percent Weight | Percent Total $Fe_2O_3$ | Percent Distribution Total Fe |
|---|---|---|---|
| Feed | 100.0 | 0.113 | 100.0 |
| Froth Product | 3.1 | 2.460 | 67.3 |
| Machine Discharge | 96.9 | 0.038 | 32.7 |

It is obvious that 67.3% of the total $Fe_2O_3$ was removed in a froth product comprising only 3.1% of the weight of the original feed, leaving a purified glass sand comprising 96.9% of the feed and containing only 0.038% $Fe_2O_3$, as contrasted with the feed which contained 0.113% $Fe_2O_3$. The excellent results obtained in this example (in contrast to the results in the tests above mentioned) were evidently due to the addition of the small amount of sulfuric acid after the first minute of conditioning of the pulp with the anionic reagents.

*Example II*

In this example, a charge of the same washed and screened material was conditioned in the same way as in Example I with anionic reagents consisting of 0.3 lb. of caustic soda, 1.0 lb. of fuel oil, 1.0 lb. of red oil (instead of tall oil) and 0.2 lb. of pine oil, all per ton of solids in the feed, and agitation was continued for about one minute. Then, without stopping the agitator, 0.5 lb. of sulfuric acid was added to the thick pulp, and the agitation was continued for about one additional minute. The conditioned pulp was then transferred to a Minerals Separation Laboratory flotation machine, was diluted with water, air was admitted, and the pulp subjected to froth-flotation treatment and the froth was removed. The metallurgical results were as follows:

| Product | Percent Weight | Percent $Fe_2O_3$ | Percent $Fe_2O_3$ Recovery |
|---|---|---|---|
| Feed | 100.0 | 0.1241 | 100.0 |
| Froth Product | 8.6 | 1.040 | 72.0 |
| Machine Discharge | 91.4 | 0.038 | 28.0 |

It will be noted that 72% of the $Fe_2O_3$ was removed in the froth product amounting to 8.6% of the weight of the original feed. This resulted in a machine discharge (the purified product) consisting of 91.4% of the weight of the feed containing only 0.038% $Fe_2O_3$ as compared with 0.1241% $Fe_2O_3$ in the feed.

*Example III*

This example was carried out on the same material and in exactly the same way as Example II, except that 1.0 lb. of fish oil fatty acid was used instead of 1.0 lb. of red oil. The metallurgical results were as follows:

| Product | Percent Weight | Percent $Fe_2O_3$ | Percent $Fe_2O_3$ Recovery |
|---|---|---|---|
| Feed | 100.0 | 0.1224 | 100.0 |
| Froth Product | 13.5 | 0.638 | 70.3 |
| Machine Discharge | 86.5 | 0.042 | 29.7 |

The satisfactory results of this example are apparent.

From the foregoing test and examples, it is evident that the process of the present invention makes possible the purification of activated glass sands which cannot be satisfactorily treated by the process of the Tartaron and Duke patent.

What is claimed is:

1. The process of separating the iron impurities from the silica in activated glass sands, which consists of agitating a thick aqueous pulp of such sands with cooperating agents consisting of a fatty acid having a hydrocarbon radical of at least twelve carbon atoms, an alkali, and a substantially insoluble and unsaponifiable oil; then adding to and mixing with said thick pulp a quantity of mineral acid so small that it is insufficient appreciably to dissolve the iron impurities in said pulp; and then diluting said conditioned pulp and subjecting it to froth flotation treatment, thereby floating off the iron impurities from the silica and leaving the residue as the purified glass sands.

2. The process of claim 1, employing sulfuric acid in the quantity of only about 0.4 lb. per ton of solids in the pulp.

References Cited in the file of this patent

UNITED STATES PATENTS 2,283,295    Tartaron et al. _____ May 19, 1942

OTHER REFERENCES

"New Flotation Reagents," Dean and Hershberger, TP. No. 605, © 1935 by A. I. M. M. E., page 9.

Taggart, Handbook of Mineral Dressing, © 1945, Section 12, page 25. Copies in Div. 55.